(12) United States Patent
Yeh et al.

(10) Patent No.: US 10,817,596 B2
(45) Date of Patent: Oct. 27, 2020

(54) IMAGE BASED AUTHENTICATION CODE METHOD, SERVER, AND AUTHENTICATION CODE SYSTEM

(71) Applicant: NANNING FUGUI PRECISION INDUSTRIAL CO., LTD., Nanning (CN)

(72) Inventors: Chia-Ming Yeh, New Taipei (TW); Rui-Tang Huang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 192 days.

(21) Appl. No.: 16/006,980

(22) Filed: Jun. 13, 2018

(65) Prior Publication Data

US 2019/0384905 A1    Dec. 19, 2019

(51) Int. Cl.
*H04L 29/06* (2006.01)
*G06F 21/36* (2013.01)
*G06T 11/00* (2006.01)

(52) U.S. Cl.
CPC .............. *G06F 21/36* (2013.01); *H04L 63/04* (2013.01); *H04L 63/08* (2013.01); *G06F 2221/2133* (2013.01); *G06T 11/00* (2013.01)

(58) Field of Classification Search
CPC ... G06F 21/36; G06F 2221/2133; H04L 63/08
See application file for complete search history.

(56) References Cited

U.S. PATENT DOCUMENTS

| 8,774,412 B2 | 7/2014 | Sun et al. | |
| 2011/0055585 A1* | 3/2011 | Lee | H04L 9/0844 713/183 |
| 2014/0136836 A1* | 5/2014 | Huang | G06F 21/36 713/155 |
| 2015/0278986 A1* | 10/2015 | Edwin | G06T 3/4023 345/428 |
| 2017/0170967 A1* | 6/2017 | Luo | G06F 21/31 |

FOREIGN PATENT DOCUMENTS

TW    201145066 A1    12/2011

* cited by examiner

*Primary Examiner* — Wasika Nipa
(74) *Attorney, Agent, or Firm* — ScienBiziP, P.C.

(57) ABSTRACT

A method for image based authentication of a human computer user as opposed to a robot is applied in a server. The server generates a CAPTCHA image and preprocesses the CAPTCHA image. The CAPTCHA image is preprocessed by halftoning and mapping pixel sparsity onto precomputed levels by block based operation. The server then encrypts the preprocessed CAPTCHA image into two shared images and transmits same to the client device. The client device renders the two shared images on a display through a user interface to facilitate superimposition of the two shared images and the user can visually decrypt the preprocessed CAPTCHA image and input an authentication code according to the CAPTCHA characters.

4 Claims, 8 Drawing Sheets

| Level | Representative Block |
|---|---|
| 0 |  |
| 1 |  |
| 2 |  |

IMAGE BASED AUTHENTICATION CODE METHOD, SERVER, AND AUTHENTICATION CODE SYSTEM

FIELD

The subject matter herein generally relates to the field of authentication code for human use of computers.

BACKGROUND

Logins (such as online financial transaction), sharing of cloud files, booking systems, and even anonymous message boards can use Completely Automated Public Turing Test to tell Computers and Humans Apart (CAPTCHA) code authentication code. CAPTCHA code is a test designed to tell whether a user is a human or a robot.

To prevent robots from automatically logging in and downloading data, causing resource consumption problems, a word-based CAPTCHA code presents an image that contains distorted characters. To pass the test, the user has to type the characters perceived in the image, something which a robot cannot usually do. However, there are many developed techniques to crack a CAPTCHA image, such as analysis of the CAPTCHA image content using optical character recognition.

Thus, there is room for improvement within the art.

BRIEF DESCRIPTION OF THE DRAWINGS

Implementations of the present technology will now be described, by way of example only, with reference to the attached figures, wherein.

DETAILED DESCRIPTION

Figure 1:
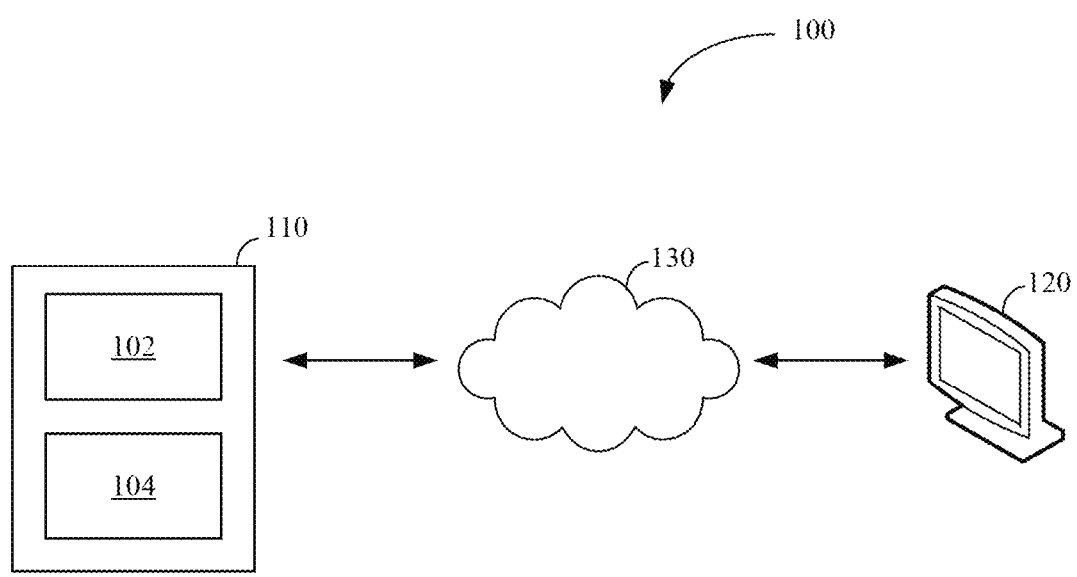
FIG. 1 is a schematic diagram of one embodiment of a running environment of an image based authentication system.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one". The term "comprising", when utilized, means "including, but not necessarily limited to"; it specifically indicates open-ended inclusion or membership in a so-described combination, group, series, and the like.

FIG. 1 illustrates a system 100 in accordance with an embodiment for image based authentication of a computer user. The system 100 comprises a server 110 and a client device 120. The server 110 and the client device 120 can communicate with each other through a wired or wireless network 130. The server 110 may comprise a processor unit 102 and a computer readable storage medium 104. The processor unit is a central processor of the server 110 and may consist of one or more integrated circuits, such as a single core or multi-core microprocessor or microcontroller, to control the functions of the server 110. The computer readable storage medium 104 may be any form of computer readable storage medium, such as flash memory, or any other non-volatile storage medium. The computer readable storage medium 104 may store one or more computer programs for operating the server 110, and be executed by the processor unit 102. The client device 120 may be a smart phone, a tablet computer, a laptop portable computer, a desktop computer, an OTT TV box, and so on.

Figure 2:
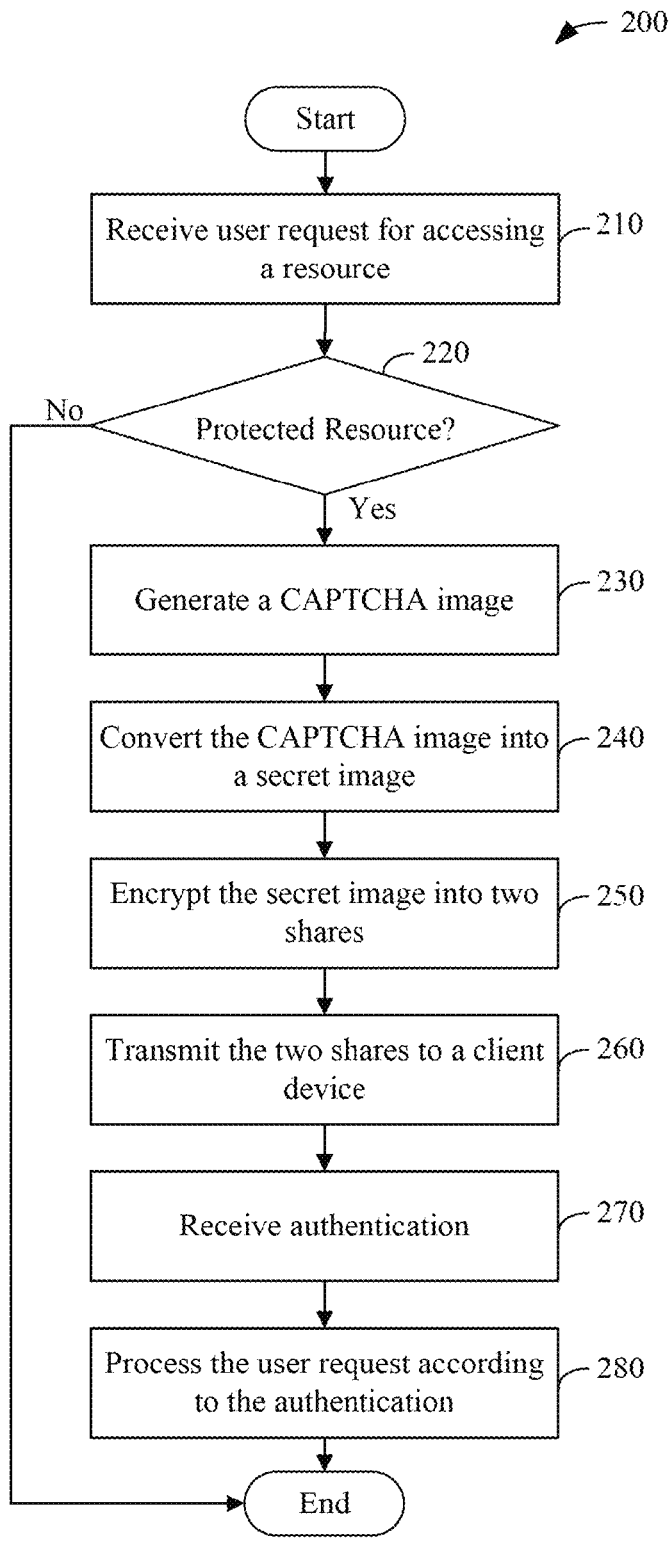
FIG. 2 is a flowchart of a method in one embodiment of an image based authentication process implemented by a server.

The server 110 may hold both public and protected resources that may be: web pages, data stored in a database, files, and other services intended to be used by a human user using the client device 120. FIG. 2 illustrates an image based authentication process 200 executed by the server 110 in accordance with one embodiment. At step 210, a user request for accessing a resource is transmitted by the client device 120 to the server 110. At step 220, the server 110 determines whether the requested resource is protected. If the requested resource is not protected, access is granted and the process 200 is finished. If the requested resource is CAPTCHA protected, the process 200 goes to step 230 to further process the authentication.

At step 230, the server 110 uses a CAPTCHA image generation algorithm to generate a CAPTCHA image comprising a CAPTCHA code. In one embodiment, a Global Unique Identifier (GUID) of the client device 120 along with the CAPTCHA code are stored in a database of the server 110.

At step 240, the server 110 preprocess of the CAPTCHA image.

Figure 3:
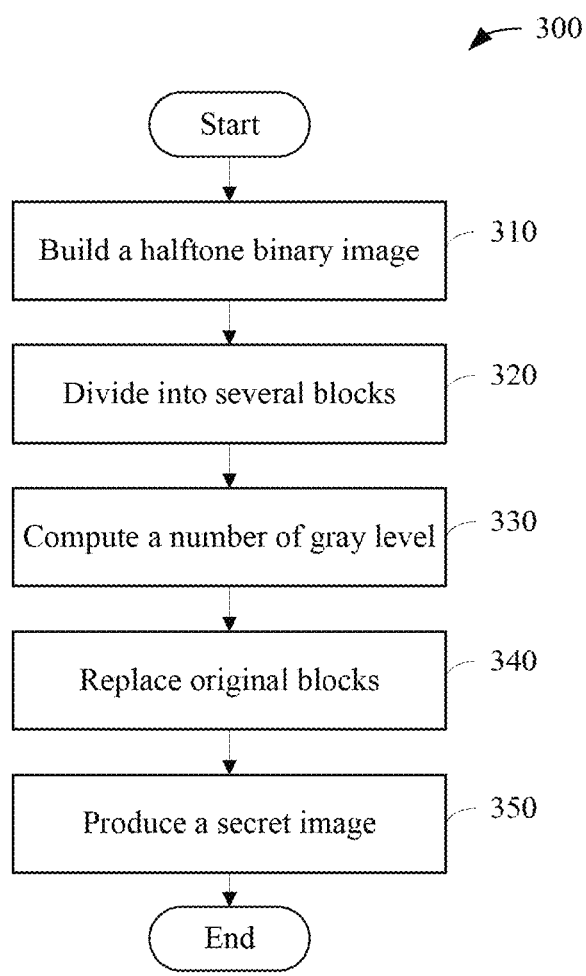
FIG. 3 is a flowchart of one embodiment of a step to preprocess a CAPTCHA image.

Referring to FIG. 3, a flowchart of a process 300 executed by the server 110 in accordance with one embodiment of preprocessing the CAPTCHA image is illustrated.

At step 310, a halftone image is built from the CAPTCHA image using a halftoning algorithm.

At step 320, the halftone image is divided into several blocks, each block having n×n pixels, where n is a random number. Assuming the halftone image comprises M×N pixels, where M, N are greater than n, and each block be made of n×n pixels, then the halftone image can be divided into (M×N)/(n×n) non-overlapping blocks.

At step 330, the number of levels, l, is computed by equation: $l=[(n \times n)/2]+1$. A representative block is determined for each level. In one embodiment, levels are numbered from 0 to $(n \times n)/2$ and the number of black pixels on the representative block are between $(n \times n)/2$ and $n \times n$. For the halftone image, the representative block with a higher density of black pixels is used to represent the higher numbered level.

Figure 4:
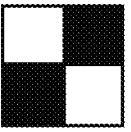
FIG. 4 is a schematic implementation of a step for determining a representative block for each level.
Figure 4:
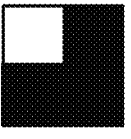
Figure 4:
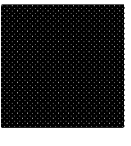
Figure 5:
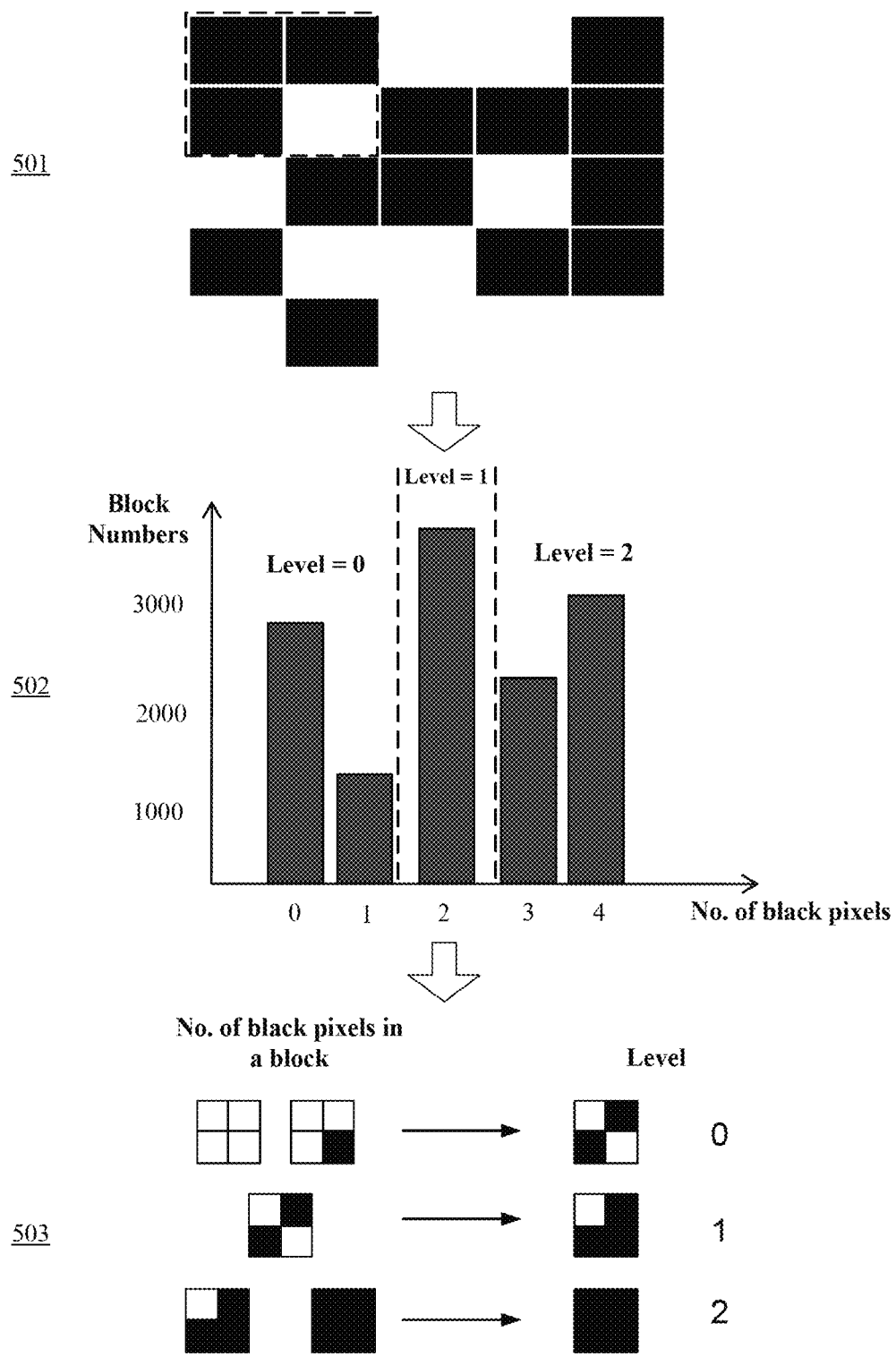
FIG. 5 is a schematic diagram showing the mapping of a block to a level and the corresponding representative block.

At step 340, the number of blocks based on black pixels of each block are counted and all the blocks are arranged into l levels so that the number of blocks of each level is averaged as much as possible. According to the level that each block belongs to, each block is replaced by the corresponding representative block. For example, a random selection of 2 for n will obtain l equals 3 from the level computing equation. Referring to FIG. 4, a schematic implementation of determining a representative block for each level is shown. A block with 2 black pixels is used to represent level 0, a block with 3 black pixels is used to represent level 1, and a block with 4 black pixels is used to represent level 2. Referring to FIG. 5, the block is mapped to the level and the corresponding representative block while executing step 340. 501 and 502 show the counting of number of blocks based on black pixels of each block and the arranging of all the blocks into l levels, wherein l=3. According to the level division shown at 502, each of the blocks is mapped onto a specific level along with the corresponding representative block. For example, as shown at 503, if the number of black pixels in the block is less than 2, then the block is mapped onto level 0 and the block is replaced by the representative block with 2 black pixels. If the number of black pixels in the block is equal to 2, then the block is mapped on to level 1 and the block is replaced by the representative block with 3 black pixels. If the number of black pixels in the block is greater than 2, then the block is mapped on to level 2 and the block is replaced by the representative block of 4 black pixels.

Returning to FIG. 3, after step 340, the preprocessed CAPTCHA image is ready to be used in a visual cryptography (VSC) method.

Returning to FIG. 2, at step 250, the server 110 executes the VSC method for encrypting the preprocessed CAPTCHA image into two shared images.

Figure 6:
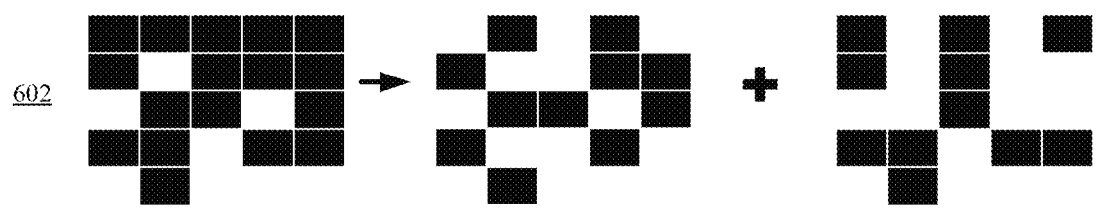
FIG. 6 is a method for visual cryptography with 2×2 block-wise operations.

In one embodiment, using the VSC method, first the preprocessed CAPTCHA image is re-divided into several blocks, each block containing n×n pixels. Second, each block is encrypted into 2 shared blocks, each shared block comprises (n×n)/2 white pixels and (n×n)/2 black pixels. For example, referring to FIG. 6, where n=2, after two shared blocks are superimposed on each other, the decrypted block may contain 2, 3, or 4 black pixels, as shown at 601. Square block-replacement by the VSC method for the preprocessed CAPTCHA image is shown at 602. Hence, the preprocessed CAPTCHA image, the decrypted CAPTCHA image, and each shared image all have the same size and the VSC method also avoids pixel expansion.

Figure 7:
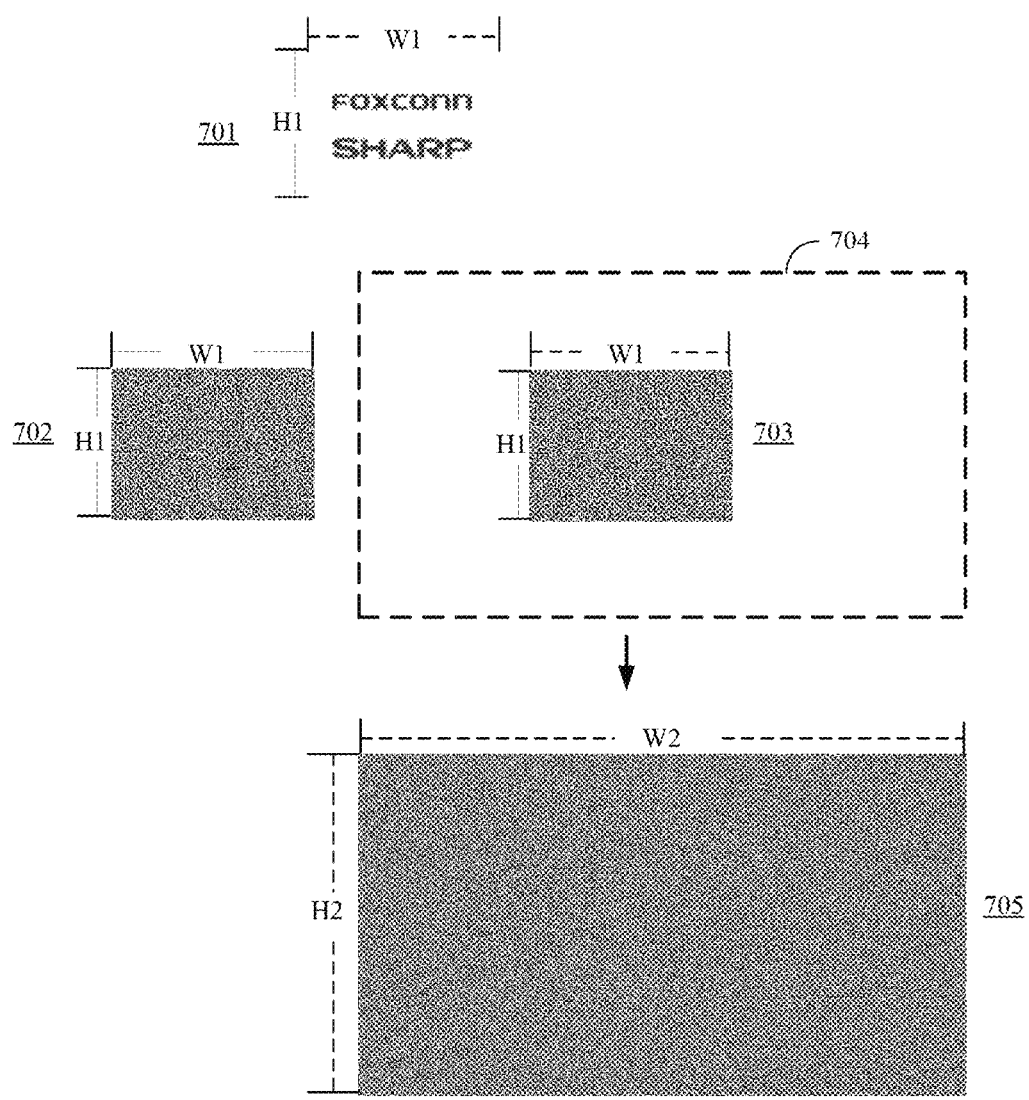
FIG. 7 is an operation of expanding one shared image.

FIG. 7 shows a CAPTCHA code 701 and the two shared images 702 and 703. The two shared images 702 and 703 were obtained by applying the VSC method to the preprocessed CAPTCHA image comprising the CAPTCHA code 701. To increase cracking difficulty, in one embodiment, the server 110 may extend the shared image 703 to a predetermined image size 704 to form an expanded shared image 705, by randomly filling in remaining pixels in blank areas. The image size of the shared images 702 and 703 are both W1×H1, and the image size of the expanded shared image 705 is W2×H2, wherein W2 is larger than W1 and H2 is larger than H1. Due to image size variation, there are (W2−W1+1)×(H2−H1+1) kinds of superimposed permutations and combinations in total, which increases the difficulty of identification by robot or other machine.

After the expansion of shared image 705, referring to FIG. 2, at step 260, the shared image 702 along with the expanded shared image 705 are transmitted to the client device 120 by the server 110.

Figure 8:
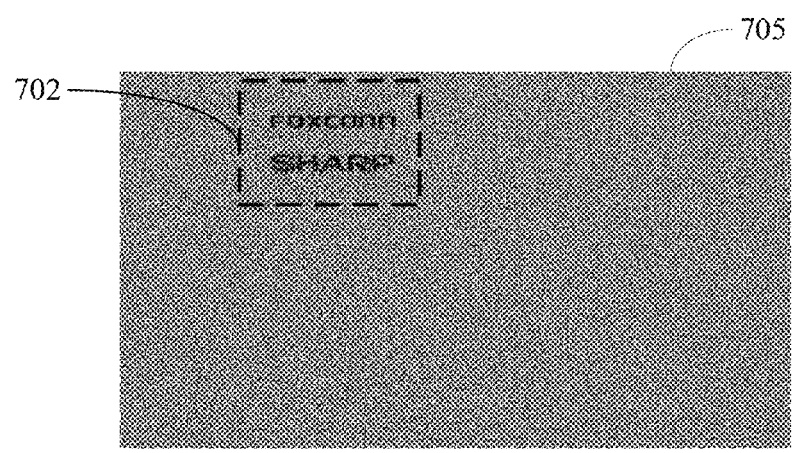
FIG. 8 is an operation of superimposing another shared image upon the expanded shared image.

The client device 120 receives the shared image 702 and the expanded shared image 705 from the server 110 and renders the shared image 702 and the expanded shared image 705 on a user interface on a display. The user may drag and drop the shared image 702 over the expanded shared image 705 through the user interface to superimpose the shared image 702 upon the expanded shared image 705, ready for visual decryption of the preprocessed CAPTCHA image comprising the CAPTCHA code 701, shown in FIG. 8. In one embodiment, the shape of the expanded shared image 705 can be adjusted in any way by the server 110 at step 250, to facilitate the superimposition. An authentication code input by the user according to the CAPTCHA code 701 is transmitted to the server 110 by the client device 120. At step 270, the server 110 receives the authentication code, or attempted authentication code. In one embodiment, the server 110 also receives the GUID of the client device 120 which transmitting the authentication code. At step 280, the server 110 authenticates the user according to the authentication code and the GUID when the authentication code matches the CAPTCHA code and accordingly either grants the user request or denies it for other reasons, and returns an authentication code notification to the client device 110.

The image based authentication code method applies visual cryptography to the CAPTCHA authentication code. Due to the size of the expanded shared image, a large number of superimposable combinations increases the cracking difficulty. It becomes practically impossible to determine which combination is correct and thus the anti-decryption feature of the CAPTCHA authentication is improved.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An image based authentication method, which is performed by a server, comprising:
    generating a CAPTCHA image comprising a CAPTCHA code;
    preprocessing the CAPTCHA image, wherein the preprocessing the CAPTCHA image comprises:
        building a halftone image from the CAPTCHA image;
        dividing the halftone image into a plurality of elementary blocks, each elementary block having n×n pixels, wherein n is a random number;
        computing number of levels, $\lambda$, wherein $\lambda=[(n \times n)/2]+1$;
        determining a representative block for each level;
        counting a number of elementary blocks based on black pixels of each of the plurality of elementary blocks and arranging the plurality of elementary blocks into levels; and replacing each of the plurality of elementary blocks with the corresponding representative block according to the level;

encrypting the preprocessed CAPTCHA image into a first and a second shared image by a visual cryptography (VSC) method, wherein the encrypting the preprocessed CAPTCHA image into a first and a second shared images by a visual cryptography (VSC) method comprises:

re-dividing the preprocessed CAPTCHA image into the plurality of elementary blocks; and encrypting each of the plurality of elementary blocks into a first and a second shared block to obtain the first and the second shared images, wherein both the first and the second shared blocks comprising (n×n)/2 white pixels and (n×n)/2 black pixels;

transmitting the first and the second shared images to a client device;

receiving, from the client device, an authentication code input by a user based on the user visually decrypting the preprocessed CAPTCHA image comprising the CAPTCHA code; and authenticating an identity of the user when the inputted authentication code matches the CAPTCHA code.

2. The method of claim 1, after encrypting the preprocessed CAPTCHA image into a first and a second shared images, the method further comprises:

expanding the second shared image by randomly filling in pixels.

3. A server enabling image based authentication, the server comprising:

a processor unit;

a computer readable storage medium for storing at least one computer program, wherein the computer program comprises instructions which are executed by the processor unit, and perform the following steps:

generating a CAPTCHA image comprising a CAPTCHA code;

preprocessing the CAPTCHA image, wherein the preprocessing the CAPTCHA image comprises:

building a halftone image from the CAPTCHA image;

dividing the halftone image into a plurality of elementary blocks, each elementary block having n×n pixels, wherein n is a random number;

computing number of levels, $\lambda$, wherein $\lambda=[(n \times n)/2]+1$;

determining a representative block for each level;

counting a number of elementary blocks based on black pixels of each of the plurality of elementary blocks and arranging the plurality of elementary blocks into levels; and replacing each of the plurality of elementary blocks with the corresponding representative block according to the level;

encrypting the preprocessed CAPTCHA image into a first and a second shared images by a visual cryptography (VSC) method, wherein the encrypting the preprocessed CAPTCHA image into a first and a second shared images by a visual cryptography (VSC) method comprises:

re-dividing the preprocessed CAPTCHA image into the plurality of elementary blocks; and encrypting each of the plurality of elementary blocks into a first and a second shared block to obtain the first and the second shared images, wherein both the first and the second shared blocks comprising (n×n)/2 white pixels and (n×n)/2 black pixels;

transmitting the first and the second shared images to a client device;

receiving, from the client device, an authentication code input by a user based on the user visually decrypting the preprocessed CAPTCHA image comprising the CAPTCHA code; and authenticating an identity of the user when the inputted authentication code matches the CAPTCHA code.

4. The server of claim 3, after encrypting the preprocessed CAPTCHA image into a first and a second shared image, further comprises:

expanding the second shared image by randomly filling in pixels.

* * * * *